(12) United States Patent
Raichelgauz et al.

(10) Patent No.: US 9,396,435 B2
(45) Date of Patent: Jul. 19, 2016

(54) SYSTEM AND METHOD FOR IDENTIFICATION OF DEVIATIONS FROM PERIODIC BEHAVIOR PATTERNS IN MULTIMEDIA CONTENT

(71) Applicant: Cortica, Ltd., Ramat Gan (IL)

(72) Inventors: Igal Raichelgauz, New York, NY (US); Karina Odinaev, New York, NY (US); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 0 days.

(21) Appl. No.: 14/509,543

(22) Filed: Oct. 8, 2014

(65) Prior Publication Data

US 2015/0026113 A1 Jan. 22, 2015

Related U.S. Application Data

(63) Continuation-in-part of application No. 13/770,603, filed on Feb. 19, 2013, which is a continuation-in-part of application No. 13/624,397, filed on Sep. 21, 2012, now Pat. No. 9,191,626, which is a (Continued)

(30) Foreign Application Priority Data

| Oct. 26, 2005 | (IL) | 171577 |
| Jan. 29, 2006 | (IL) | 173409 |
| Aug. 21, 2007 | (IL) | 185414 |

(51) Int. Cl.
*G06N 5/00* (2006.01)
*G06F 1/00* (2006.01)
(Continued)

(52) U.S. Cl.
CPC ............ *G06N 5/04* (2013.01); *G06F 17/30899* (2013.01); *G06K 9/00536* (2013.01);
(Continued)

(58) Field of Classification Search
CPC ........... G06N 5/02; G06N 5/04; G06N 5/022; G06Q 50/01
See application file for complete search history.

(56) References Cited

U.S. PATENT DOCUMENTS

| 4,972,363 A | 11/1990 | Nguyen et al. |
| 5,887,193 A | 3/1999 | Takahashi et al. |

(Continued)

FOREIGN PATENT DOCUMENTS

| WO | 0231764 | 4/2002 |
| WO | 20070049282 | 5/2007 |

OTHER PUBLICATIONS

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, Be, vol. 3533, Jun. 2005, pp. 121-130.

(Continued)

*Primary Examiner* — Stanley K Hill
*Assistant Examiner* — Kalpana Bharadwaj
(74) *Attorney, Agent, or Firm* — M&B IP Analysts, LLC

(57) ABSTRACT

A method and system for identification of a deviation from a periodic behavior pattern in a sequence of multimedia content segments are provided. The system comprises receiving the sequence of multimedia content segments; generating at least one signature for each multimedia content segment of the sequence of multimedia content segments; comparing at least two signatures generated for at least two consecutive multimedia content segments to detect a periodic behavior pattern; upon detecting the periodic behavior pattern, comparing at least one signature generated for at least a subsequently received multimedia content segment to at least one signature representing the detected multimedia content segment to identify a deviation from the periodic behavior pattern; and upon identifying the deviation from the periodic behavior pattern, generating a notification with respect to the at least one deviation.

13 Claims, 4 Drawing Sheets

Related U.S. Application Data continuation-in-part of application No. 13/344,400, filed on Jan. 5, 2012, now Pat. No. 8,959,037, which is a continuation-in-part of application No. 12/434,221, filed on May 1, 2009, now Pat. No. 8,112,376, which is a continuation-in-part of application No. 12/195,863, filed on Aug. 21, 2008, now Pat. No. 8,326,775, which is a continuation-in-part of application No. 12/084,150, filed as application No. PCT/IL2006/001235 on Oct. 26, 2006, now Pat. No. 8,655,801.

(60) Provisional application No. 61/889,542, filed on Oct. 11, 2013.

(51) Int. Cl.
*G06N 5/04* (2006.01)
*G10L 15/32* (2013.01)
*G06K 9/00* (2006.01)
*G06F 17/30* (2006.01)
*G06Q 30/02* (2012.01)
*H04H 60/37* (2008.01)
*H04H 60/56* (2008.01)
*H04N 7/173* (2011.01)
*H04N 21/258* (2011.01)
*H04N 21/2668* (2011.01)
*H04N 21/466* (2011.01)
*H04N 21/81* (2011.01)
*H04H 60/48* (2008.01)

(52) U.S. Cl.
CPC ........ *G06K9/00744* (2013.01); *G06Q 30/0251* (2013.01); *G10L 15/32* (2013.01); *H04H 60/37* (2013.01); *H04H 60/48* (2013.01); *H04H 60/56* (2013.01); *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01)

(56) References Cited

U.S. PATENT DOCUMENTS

| | | |
|---|---|---|
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,076,088 A | 6/2000 | Paik et al. |
| 6,122,628 A | 9/2000 | Castelli et al. |
| 6,128,651 A | 10/2000 | Cezar |
| 6,240,423 B1 | 5/2001 | Hirata |
| 6,243,375 B1 | 6/2001 | Speicher |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,523,022 B1 | 2/2003 | Hobbs |
| 6,524,861 B1 | 2/2003 | Anderson |
| 6,526,400 B1 | 2/2003 | Takata et al. |
| 6,560,597 B1 | 5/2003 | Dhillon et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,675,159 B1 | 1/2004 | Lin et al. |
| 6,728,706 B2 | 4/2004 | Aggarwal et al. |
| 6,751,363 B1 | 6/2004 | Natsev et al. |
| 6,751,613 B1 | 6/2004 | Lee et al. |
| 6,754,435 B2 | 6/2004 | Kim |
| 6,763,519 B1 | 7/2004 | McColl et al. |
| 6,804,356 B1 | 10/2004 | Krishnamachari |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,047,033 B2 | 5/2006 | Wyler |
| 7,124,149 B2 | 10/2006 | Smith et al. |
| 7,260,564 B1 | 8/2007 | Lynn et al. |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,340,458 B2 | 3/2008 | Vaithilingam et al. |
| 7,346,629 B2 | 3/2008 | Kapur et al. |
| 7,353,224 B2 | 4/2008 | Chen et al. |
| 7,376,672 B2 | 5/2008 | Weare |
| 7,376,722 B1 | 5/2008 | Sim et al. |
| 7,392,238 B1 | 6/2008 | Zhou et al. |
| 7,406,459 B2 | 7/2008 | Chen et al. |
| 7,433,895 B2 | 10/2008 | Li et al. |
| 7,450,740 B2 | 11/2008 | Shah et al. |
| 7,464,086 B2 | 12/2008 | Black et al. |
| 7,519,238 B2 | 4/2009 | Robertson et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,536,417 B2 | 5/2009 | Walsh et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,660,737 B1 | 2/2010 | Lim et al. |
| 7,689,544 B2 | 3/2010 | Koenig |
| 7,694,318 B2 | 4/2010 | Eldering et al. |
| 7,697,791 B1 | 4/2010 | Chan et al. |
| 7,769,221 B1 | 8/2010 | Shakes et al. |
| 7,788,132 B2 | 8/2010 | Desikan et al. |
| 7,788,247 B2 | 8/2010 | Wang et al. |
| 7,860,895 B1 | 12/2010 | Scofield et al. |
| 7,904,503 B2 | 3/2011 | Van De Sluis |
| 7,920,894 B2 | 4/2011 | Wyler |
| 7,921,107 B2 | 4/2011 | Chang et al. |
| 7,974,994 B2 | 7/2011 | Li et al. |
| 7,987,194 B1 | 7/2011 | Walker et al. |
| 7,991,715 B2 | 8/2011 | Schiff et al. |
| 8,000,655 B2 | 8/2011 | Wang et al. |
| 8,036,893 B2 | 10/2011 | Reich |
| 8,098,934 B2 | 1/2012 | Vincent et al. |
| 8,266,185 B2 | 9/2012 | Raichelgauz et al. |
| 8,312,031 B2 | 11/2012 | Raichelgauz et al. |
| 8,316,005 B2 | 11/2012 | Moore |
| 8,332,478 B2 | 12/2012 | Levy et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,191,626 B2 | 11/2015 | Raichelgauz et al. |

(56) References Cited

U.S. PATENT DOCUMENTS

| | | | |
|---|---|---|---|
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 2001/0019633 A1 | 9/2001 | Tenze et al. |
| 2001/0056427 A1 | 12/2001 | Yoon et al. |
| 2002/0087530 A1 | 7/2002 | Smith et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0178410 A1* | 11/2002 | Haitsma ............ G06F 17/30787 714/709 |
| 2003/0028660 A1 | 2/2003 | Igawa et al. |
| 2003/0041047 A1 | 2/2003 | Chang et al. |
| 2003/0078766 A1 | 4/2003 | Appelt et al. |
| 2003/0182567 A1 | 9/2003 | Barton et al. |
| 2003/0191764 A1 | 10/2003 | Richards |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0128142 A1 | 7/2004 | Whitham |
| 2004/0128511 A1 | 7/2004 | Sun et al. |
| 2004/0153426 A1 | 8/2004 | Nugent |
| 2004/0249779 A1 | 12/2004 | Nauck et al. |
| 2005/0177372 A1 | 8/2005 | Wang et al. |
| 2006/0020860 A1* | 1/2006 | Tardif ............ G01R 31/318566 714/724 |
| 2006/0026203 A1 | 2/2006 | Tan et al. |
| 2006/0031216 A1 | 2/2006 | Semple et al. |
| 2006/0064037 A1* | 3/2006 | Shalon ............... A61B 5/0006 600/586 |
| 2006/0153296 A1 | 7/2006 | Deng |
| 2006/0159442 A1 | 7/2006 | Kim et al. |
| 2006/0173688 A1 | 8/2006 | Whitham |
| 2006/0204035 A1 | 9/2006 | Guo et al. |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0038608 A1 | 2/2007 | Chen |
| 2007/0074147 A1 | 3/2007 | Wold |
| 2007/0130112 A1 | 6/2007 | Lin |
| 2007/0130159 A1 | 6/2007 | Gulli et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2008/0019614 A1 | 1/2008 | Robertson et al. |
| 2008/0040277 A1 | 2/2008 | DeWitt |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0037408 A1 | 2/2009 | Rodgers |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0148045 A1 | 6/2009 | Lee et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0216639 A1 | 8/2009 | Kapczynski et al. |
| 2009/0245603 A1 | 10/2009 | Koruga et al. |
| 2009/0253583 A1 | 10/2009 | Yoganathan |
| 2009/0254824 A1 | 10/2009 | Singh |
| 2009/0277322 A1 | 11/2009 | Cai et al. |
| 2010/0023400 A1 | 1/2010 | Dewitt |
| 2010/0082684 A1 | 4/2010 | Churchill et al. |
| 2010/0088321 A1 | 4/2010 | Solomon et al. |
| 2010/0104184 A1 | 4/2010 | Bronstein et al. |
| 2010/0106857 A1 | 4/2010 | Wyler |
| 2010/0162405 A1 | 6/2010 | Cook et al. |
| 2010/0191567 A1 | 7/2010 | Lee et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0035289 A1 | 2/2011 | King et al. |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0125727 A1 | 5/2011 | Zou et al. |
| 2011/0145068 A1 | 6/2011 | King et al. |
| 2011/0202848 A1 | 8/2011 | Ismalon |
| 2011/0208822 A1 | 8/2011 | Rathod |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0131454 A1 | 5/2012 | Shah |
| 2012/0167133 A1 | 6/2012 | Carroll et al. |
| 2012/0191686 A1 | 7/2012 | Hjelm et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2015/0289022 A1 | 10/2015 | Gross |

OTHER PUBLICATIONS

Cernansky et al., "Feed-forward Echo State Networks"; Proceedings of International Joint Conference on Neural Networks, Montreal, Canada, Jul. 31-Aug. 4, 2005.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan et al., "Content-Based Retrieval of Music and Audio"; 1997, Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

International Search Authority: "Written Opinion of the International Searching Authority" (PCT Rule 43bis.1) including International Search Report for International Patent Application No. PCT/US2008/073852; Date of Mailing: Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

International Search Report for the corresponding International Patent Application PCT/IL2006/001235; Date of Mailing: Nov. 2, 2008.

IPO Examination Report under Section 18(3) for corresponding UK application No: GB1001219.3, dated Sep. 12, 2011; Entire Document.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

(56) References Cited

OTHER PUBLICATIONS

Jaeger, H.: "The "echo state" approach to analysing and training recurrent neural networks", GMD Report, No. 148, 2001, pp. 1-43, XP002466251. German National Research Center for Information Technology.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.
Natschlager, T. et al.: "The "liquid computer": A novel strategy for real-time computing on time series", Special Issue on Foundations of Information Processing of Telematik, vol. 8, No. 1, 2002, pp. 39-43, XP002466253.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.
Verstraeten et al.: "Isolated word recognition with the Liquid State Machine; a case study", Information Processing Letters, Amsterdam, NL, col. 95, No. 6, Sep. 30, 2005, pp. 521-528, XP005028093 ISSN: 0020-0190.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Zeevi, Y. et al.: "Natural Signal Classification by Neural Cliques and Phase-Locked Attractors", IEEE World Congress on Computational Intelligence, IJCNN2006, Vancouver, Canada, Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Boari et al., "Adaptive Routing for Dynamic Applications in Massively Parallel Architectures", 1995 IEEE, Spring 1995.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Garcia, "Solving the Weighted Region Least Cost Path Problem Using Transputers", Naval Postgraduate School, Monterey, California, Dec. 1989.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Guo et al, "AdOn: An Intelligent Overlay Video Advertising System", SIGIR, Boston, Massachusetts, Jul. 19-23, 2009.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.
Liu, et al., "Instant Mobile Video Search With Layered Audio-Video Indexing and Progressive Transmission", Multimedia, IEEE Transactions on Year 2014, vol. 16, Issue: 8, pp. 2242-2255, DOI: 10.1109/TMM.2014.2359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 167-470, DOI: 10.1109/ISIMP2004.1434102 IEEE Conference Publications, Hong Kong.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP2009.4960375, IEEE Conference Publications, Arizona.
May et al., "The Transputer", Springer-Verlag, Berlin Heidelberg, 1989, teaches multiprocessing system.
Vouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP2012.6343465, Czech Republic.
Vailaya, et al., "Content-Based Hierarchical Classification of Vacation Images," I.E.E.E: Multimedia Computing and Systems, vol. 1, 1999, East Lansing, MI, pp. 518-523.
Vallet, et al., "Personalized Content Retrieval in Context Using Ontological Knowledge," IEEE Transactions on circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.

* cited by examiner

SYSTEM AND METHOD FOR IDENTIFICATION OF DEVIATIONS FROM PERIODIC BEHAVIOR PATTERNS IN MULTIMEDIA CONTENT

CROSS-REFERENCE TO RELATED APPLICATIONS

This application claims the benefit of U.S. Provisional Application No. 61/889,542 filed on Oct. 11, 2013, the contents of which are hereby incorporated by reference. This application is also a continuation-in-part (CIP) of U.S. patent application Ser. No. 13/770,603 filed on Feb. 19, 2013, now pending. The Ser. No. 13/770,603 application is a CIP of U.S. patent application Ser. No. 13/624,397 filed on Sep. 21, 2012, now pending. The Ser. No. 13/624,397 is a CIP of:

(a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;

(b) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084, 150; and, (c) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005 and Israeli Application No. 173409 filed on Jan. 29, 2006.

All of the applications referenced above are herein incorporated by reference for all that they contain.

TECHNICAL FIELD

The present invention relates generally to the analysis of multimedia content, and more specifically to a system and method for detecting common patterns in multimedia content and determining deviation from the identified common patterns.

BACKGROUND

Multimedia capturing devices are commonly used for monitoring different areas or activities such as traffic control, security control, and human health diagnosis. For example, multimedia capturing devices may be utilized for monitoring babies' breathing while they sleep based on sounds made by the babies during sleep.

The multimedia capturing devices may implement or utilize content recognition solutions for analyzing the different types of multimedia content. Such solutions are designed to process, analyze, and understand multimedia content from the real world in order to produce numerical or symbolic information to reach certain decisions. A decision in multimedia content analysis may be, for example, a detection of an irregular pattern throughout the multimedia content.

Various techniques for pattern recognition are disclosed in the related art. However, due to the fact that patterns are often evenly distributed within the data, recognition of uncommon patterns typically requires extensive computing resources. Specifically, some patterns can be more prominent than others. Such patterns are likely to have a larger number of occurrences, while other patterns may be very rare. In addition, some patterns may be correlated to each other, and together such patterns form pattern-combinations which may also be very popular. This poses a problem to applications for pattern recognition systems.

As pattern recognition is not an easy problem to solve, detection of deviations from such patterns also poses similar challenges as well. Therefore, the ability to identify irregular events by analysis of multimedia content may be limited.

SUMMARY

The various disclosed embodiments include a method for identification of a deviation from a periodic behavior pattern in a sequence of multimedia content segments. The method comprises receiving the sequence of multimedia content segments; generating at least one signature for each multimedia content segment of the sequence of multimedia content segments; comparing at least two signatures generated for at least two consecutive multimedia content segments to detect a periodic behavior pattern; upon detecting the periodic behavior pattern, comparing at least one signature generated for at least a subsequently received multimedia content segment to at least one signature representing the detected multimedia content segment to identify a deviation from the periodic behavior pattern; and upon identifying the deviation from the periodic behavior pattern, generating a notification with respect to the at least one deviation.

The various disclosed embodiments include a system for a system for identification of a deviation from a periodic behavior pattern in a sequence of multimedia content segments. The system comprises a processing system; a memory connected to the processing system, the memory contains instructions that when executed by the processing system, configure the system to: receive the sequence of multimedia content segments; generate at least one signature for each multimedia content segment of the sequence of multimedia content segments; compare at least two signatures generated for at least two consecutive multimedia content segments to detect a periodic behavior pattern; upon detection of the periodic behavior pattern, compare at least one signature generated for at least a subsequently received multimedia content segment to at least one signature representing the detected multimedia content segment to identify a deviation from the periodic behavior pattern; and upon identification of the deviation from the periodic behavior pattern, generate a notification with respect to the at least one deviation.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
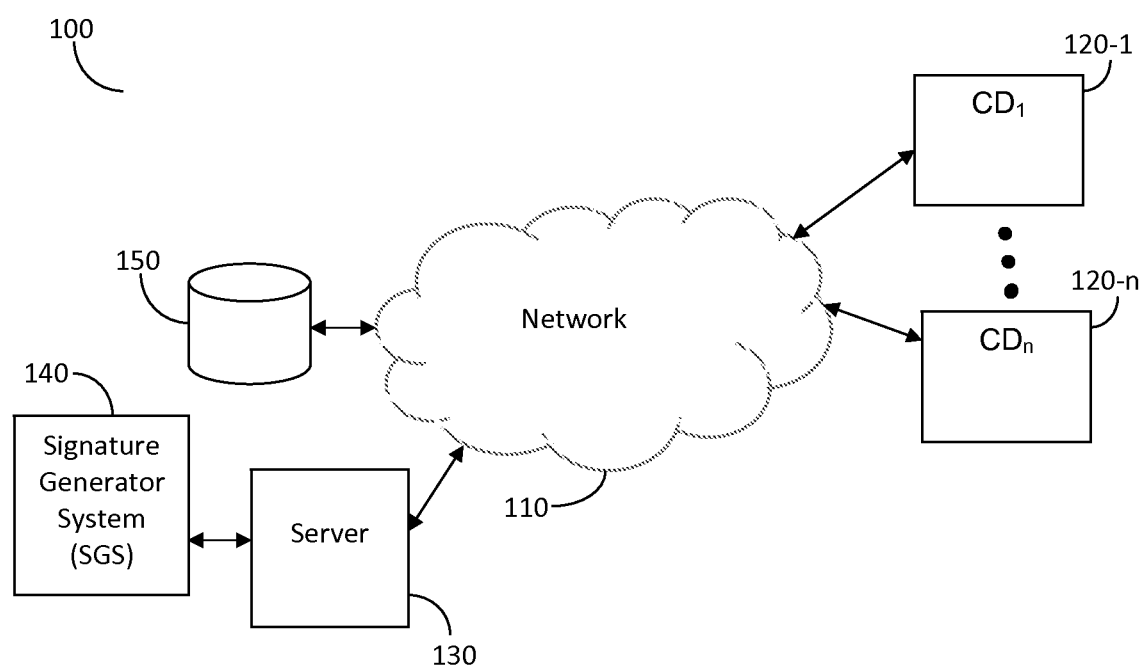
FIG. 1 is a schematic block diagram of a network system utilized to describe the various embodiments disclosed herein.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

By way of example, the disclosed embodiments include a method and system for identification of deviations from common patterns in multimedia content. The identification of deviations is based on analysis of a sequence of segments of continuously received multimedia content. The analysis is based on signatures generated for the segments of content and detection of periodic behavior pattern of the signatures. In an embodiment, upon identification of a deviation from the detected periodic behavior pattern, a notification is provided to a user.

FIG. 1 shows an exemplary and non-limiting schematic diagram of a network system 100 utilized to describe the various embodiments disclosed herein. A network 110 is used to communicate between different elements of the system 100. The network 110 may be the Internet, the world-wide-web (WWW), a local area network (LAN), a wide area network (WAN), a metro area network (MAN), and other networks capable of enabling communication between the elements of the system 100.

Further connected to the network 110 are one or more computing devices (CDs) 120-1 through 120-n (hereinafter referred to collectively as computing device 120 or individually as a computing device 120). A computing device 120 may be, for example, a personal computer (PC), a personal digital assistant (PDA), a mobile phone, a wearable computing device, a smart phone, a tablet computer, a camera (e.g., surveillance camera, a traffic control camera, etc.), and other kinds of wired and mobile appliances, equipped with capabilities such as capturing, storing, and managing capabilities, that are enabled as further discussed herein below. The computing device 120 may further comprise an application software 125 (hereinafter referred to as an application or app, merely for simplicity purposes) installed therein. The application 125 is configured to provide continuous segments of multimedia content captured by or stored in the respective computing device 120 to a server 130. The application 125 is also configured to receive notifications from the server 130 about irregular events being detected. In an exemplary embodiment, the applications 125 are programmed for security, traffic control, entertainment, and other such purposes. An application 125 may be installed in the respective computing device or downloaded from an application repository, such as the AppStore®, Google Play® and the like.

The various embodiments disclosed herein are realized using the server 130 and a signature generator system (SGS) 140. The SGS 140 may be connected to the server 130 directly or through the network 110. The server 130 is configured to receive and serve multimedia content that comprises a sequence of segments and to cause the SGS 140 to generate a signature respective of each segment within the multimedia content. The process for generating the signatures for the multimedia content segments is explained in more detail herein below with respect to FIGS. 3 and 4. A multimedia content segment may be, for example, an image, a graphic, a video signal, an audio signal, a photograph, and an image of signals (e.g., spectrograms, phasograms, scalograms, etc.), and/or combinations thereof and portions thereof.

According to the disclosed embodiments, the server 130 is configured to analyze the signatures generated for the content segments to detect periodic behaviors patterns. In a non-limiting embodiment, a periodic behavior pattern may be related to an object that appears and/or an event or activity that occurs through a number of consecutive segments with regular time intervals. In an embodiment, the detection of periodic behavior patterns is achieved by comparing signatures of consecutive content segments to each other. At least two signatures of at least two different content segments are considered as having a periodic behavior pattern if the respective signatures overlap more than a preconfigured threshold level. The preconfigured threshold level may be configured based on, for example, the sensitivity of the detection. For example, a lower threshold value may be set for a security application than would be set for an entertainment application.

In an exemplary embodiment, a decision threshold value is also preconfigured. The decision threshold value is the number of consecutive content segments of matching signatures. The decision threshold value may be based on, but is not limited to, an actual number of segments or a time duration. That is, a common behavior pattern is detected only if the same object or event is identified in a number of consecutive content segments or in consecutive content segments of a total time duration exceeding the decision threshold.

In an exemplary embodiment, a baseline signature representing a common periodic behavior pattern is generated and utilized for comparison with signatures other content segments. Such a baseline signature may be generated by correlating signatures of content segments determined to present a periodic behavior pattern.

The server 130 is further configured to detect at least one deviation from the identified periodic behavior pattern. This can be achieved by determining that one or more signatures generated for content segments do not match the baseline signature and/or that at least one signature generated for a segment represents a behavior pattern. Thus, in an embodiment, a deviation from the identified periodic behavior pattern is realized by comparing the respective signatures. At least two different content segments are considered as deviated if the respective signatures overlap less than a preconfigured threshold level. It should be noted that the same threshold level used for the detection of periodic behavior patterns may be utilized to detect the deviations. In another embodiment, different threshold levels are utilized for the identification of behavior patterns and deviations from such patterns.

In an embodiment, upon identification of such deviation, a notification is generated by the server 130 and provided to the computing device 120 or to another device connected to the server 130 through the network 110 as predetermined by the computing device 120.

As noted above, a periodic behavior pattern may be related to an object that appears and/or an event that occurs through a number of consecutive content segments. In an embodiment, in order to identify such objects and/or events, the server 130 is configured to determine the context of the content segments.

A context is a set of common patterns among concepts. Mathematically, a context can be represented as a matrix of co-occurrences of concepts. A threshold may be associated with the number of co-occurrences of concepts in the matrix to establish a context. A concept is a collection of signatures representing a multimedia element and metadata describing the concept. The collection is a signature reduced cluster generated by inter-matching the signatures generated for the many multimedia elements, clustering the inter-matched signatures, and providing a reduced cluster set of such clusters. As a non-limiting example, a 'Superman concept' is a signature reduced cluster of signatures describing elements (such as multimedia elements) related to, e.g., a Superman cartoon: a set of metadata consisting of textual representations of the Superman concept. Techniques for generating concepts and concept structures are described further in the U.S. Pat. No. 8,266,185 to Raichelgauz, et al., which is assigned to common assignee, and is incorporated hereby by reference for all that it contains.

As an example, a content segment (or a set of more than one content segment) may include images of palm trees, a beach, and the coast line of San Diego. In this example, the determined context of the content segment may be determined to be "California sea shore."

In certain implementations, one or more probabilistic models may be utilized to determine the correlation between signatures representing concepts in order to determine the context. The probabilistic models determine, for example, the probability that a signature may appear in the same orientation and in the same ratio as another signature.

Alternatively or collectively, according to another embodiment, the server 130 is further configured to utilize one or more environmental variables related to the sequence of content segments to determine the context. Such environmental variables may include, for example, a time of the day, a capturing place, and so on.

As an example, the server 130 is configured to receive a video from a traffic control camera of a 3 mile long section of a highway. The video is captured during rush hour time. The server 130 together with the SGS 140 identifies that every morning around 200 vehicles are driving in the highway at an average speed of 50 miles per hour. Upon identification of a deviation from this periodic behavior pattern, for example in a case where 20 vehicles are driving in an average speed of 20 miles per hour on the section of the highway, a notification is provided by the server 130. As another example, where only around 100 vehicles are driving on the highway, a deviation may be identified.

The server 130 further communicates with a data warehouse 150 through the network 110. In other non-limiting configurations (not shown), the server 130 is directly connected to the data warehouse 150. The data warehouse 150 is configured to store the multimedia content, periodic behaviors within the multimedia content, and deviations from periodic behaviors as determined by the server 130.

It should be noted that each of the server 130 and the SGS 140 typically comprises a processing system (not shown) that is coupled to a memory (not shown), and optionally a network interface (not shown). The processing system is connected to the memory, which typically contains instructions that can be executed by the processing system. The server 130 may also include a network interface (not shown) to the network 110. In one embodiment, the processing system is realized or includes an array of Computational Cores configured as discussed in more detail below. In another embodiment, the processing system of each of the server 130 and SGS 140 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Figure 2:
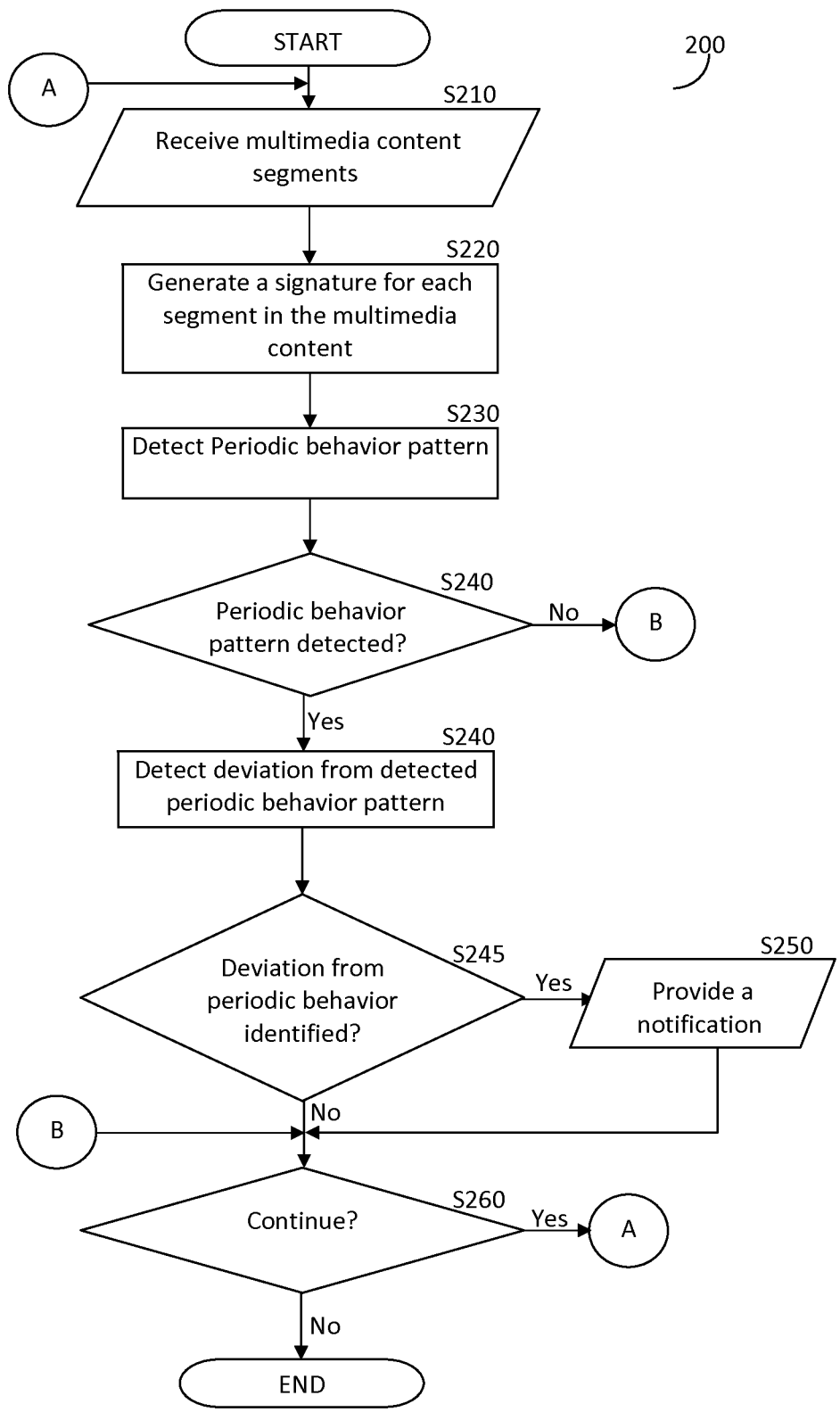
FIG. 2 is a flowchart describing a method of identifying deviations from common patterns in multimedia content according to an embodiment.

FIG. 2 depicts an exemplary and non-limiting flowchart 200 describing the process of identifying deviations from behavior patterns in multimedia content according to one embodiment. At S210, a sequence of segments of multimedia content is received from a computing device such as, for example, the computing device 120-1.

In S220, at least one signature is generated for each segment in the multimedia content. The signatures for each segment in the multimedia content are generated by the SGS 140 as further described herein below with respect to FIGS. 3 and 4. The at least one generated signature is robust to noise and distortion.

In S230, a periodic behavior pattern is detected through the received consecutive content segments. The detection is based on the generated signatures. According to one embodiment, a first threshold level and the decision threshold are set to preconfigured values. The signatures of each of the consecutive content segments are matched to each other. At least two signatures of the two different content segments are considered as having a periodic behavior pattern when the respective signatures overlap more than the value of the threshold level. A detection of a periodic behavior pattern is achieved when the number of matching consecutive segments exceeds the decision threshold. At S235, it is checked if a periodic behavior pattern is detected, and if so, execution continues with S240; otherwise, execution continues with S260. In an embodiment, if a periodic behavior pattern is identified, a baseline signature is generated respective thereof.

In S240, a deviation from the periodic behavior pattern is detected. In an embodiment, S240 includes comparing signatures generated for content segments to the baseline signature and/or at least one signature generated for a segment that represents a behavior pattern. In case at least two compared signatures do not overlap less than a second preconfigured threshold level, a deviation is detected. In an embodiment, the first and second threshold levels are the same.

In S245, it is checked whether at least one deviation from the at least one periodic behavior is identified and, if so, execution continues with S250, where a notification respective of the deviation is generated and reported; otherwise, execution continues with S260. In S260, it is checked whether operation will continue and, if so, execution continues with S220; otherwise, execution terminates.

Figure 3:
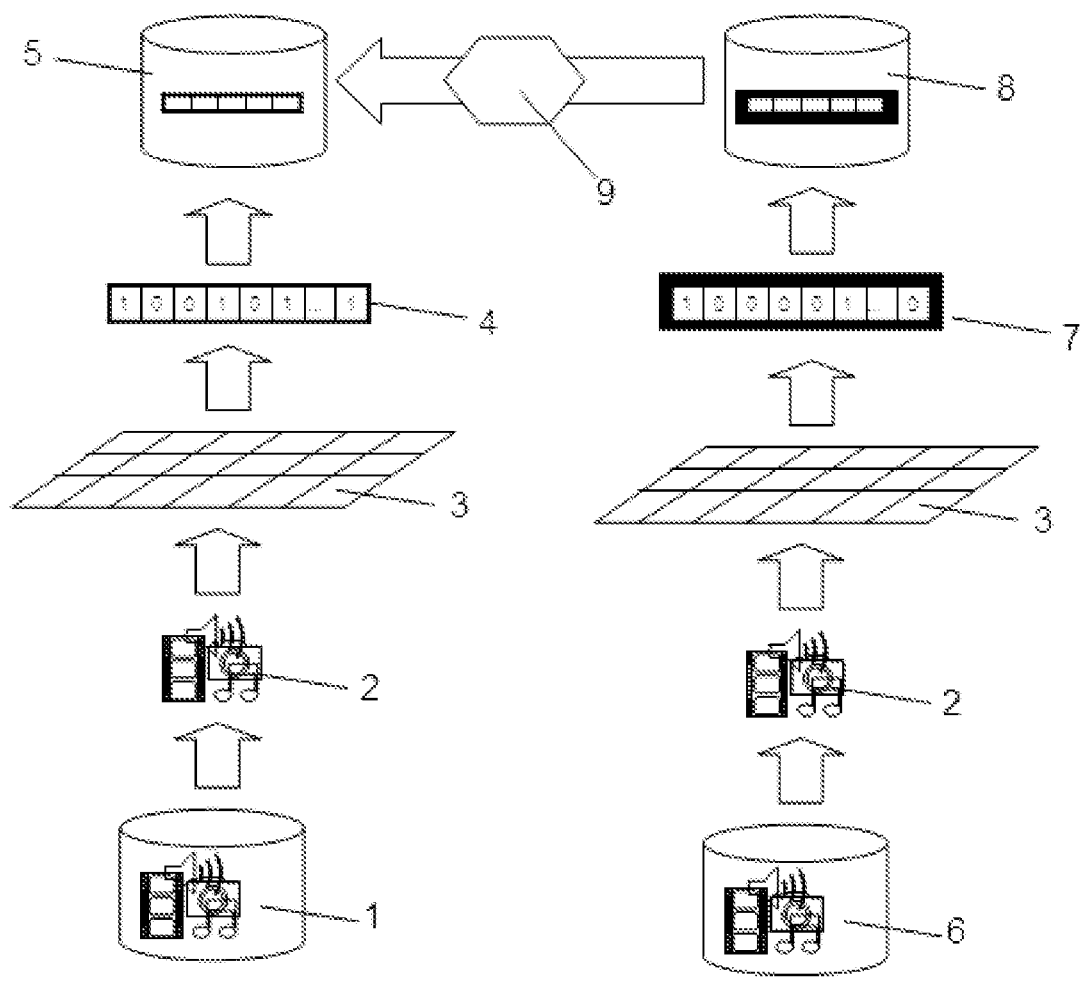
FIG. 3 is a block diagram depicting the basic flow of information in the signature generator system according to an embodiment.
Figure 4:
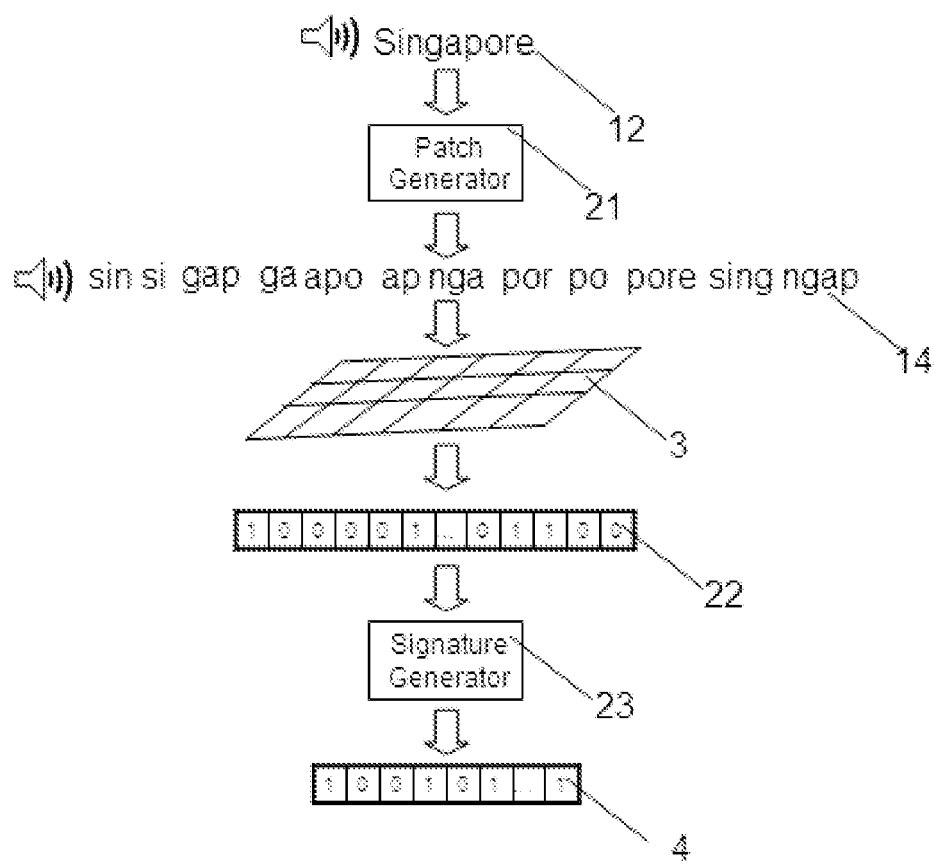
FIG. 4 is a diagram showing the flow of patches generation, response vector generation, and signature generation in a large-scale speech-to-text system according to an embodiment.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 3. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node ni equations are:

$$V_i = \sum_j w_{ij} k_j$$

$$n_i = \prod (Vi - Th_x)$$

where, Π is a Heaviside step function; $w_{ij}$ is a coupling node unit (CNU) between node i and image component j (for example, grayscale value of a certain pixel j); kj is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values $Th_x$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$ $1 - p(V > Th_S) - 1 - (1-\epsilon)^l \ll 1$ i.e., given that l nodes (cores) constitute a Robust Signature of a certain image I, the probability that not all of these l nodes will belong to the Signature of same, but noisy image, $\tilde{I}$ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the co-pending U.S. Pat. No. 8,655,801 referenced above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identification of a deviation from a periodic behavior pattern in a sequence of multimedia content segments, comprising:
   receiving the sequence of multimedia content segments;
   generating at least one signature for each multimedia content segment of the sequence of multimedia content segments;
   comparing at least two signatures generated for at least two consecutive multimedia content segments to detect a periodic behavior pattern, wherein the detection of the periodic behavior pattern further includes providing a baseline signature respective of the periodic behavior pattern;
   upon detecting the periodic behavior pattern, compare at least one signature generated for at least a subsequently received multimedia content segment to the baseline signature;
   identifying a deviation from the periodic behavior pattern when the at least one signature generated for the at least subsequently received multimedia content segment and the baseline signature overlap less than a second preconfigured threshold level; and
   upon identifying the deviation from the periodic behavior pattern, generating a notification with respect to the deviation.

2. The method of claim of 1, wherein each multimedia content segment of the sequence of multimedia content segments is at least one of: an image, a graphic, a video stream, a video clip, an audio stream, an audio clip, a video frame, a photograph, images of signals, and portions thereof.

3. The method of claim 1, wherein the periodic behavior pattern is related to at least one of: an object that appears in the sequence of multimedia content segments in regular time intervals, an event that occurs through the sequence of multimedia content segments in regular time intervals, and an activity that occurs through a number of consecutive segments in regular time intervals.

4. The method of claim 3, wherein the object, the event, and the activity are determined using a context of the received sequence of multimedia content segments.

5. The method of claim 1, wherein the periodic behavior pattern is identified upon identification of a number of consecutive content segments of matching signatures exceeding a decision threshold.

6. The method of claim 5, wherein at least two signatures match when the at least two signatures overlap more than a first preconfigured threshold level.

7. A non-transitory computer readable medium having stored thereon instructions for causing one or more processing units to execute the method according to claim 1.

8. A system for identification of a deviation from a periodic behavior pattern in a sequence of multimedia content segments, comprising:
   a processing system; and
   a memory connected to the processing system, the memory contains instructions that when executed by the processing system, configure the system to:
   receive the sequence of multimedia content segments;
   generate at least one signature for each multimedia content segment of the sequence of multimedia content segments;
   compare at least two signatures generated for at least two consecutive multimedia content segments to detect a periodic behavior pattern;
   provide a baseline signature respective of the periodic behavior pattern;
   upon detecting the periodic behavior pattern, compare at least one signature generated for at least a subsequently received multimedia content segment to the baseline signature;
   identify a deviation from the periodic behavior pattern when the at least one signature generated for the at least subsequently received multimedia content segment and the baseline signature overlap less than a second preconfigured threshold level; and
   upon identification of the deviation from the periodic behavior pattern, generate a notification with respect to the deviation.

9. The system of claim 8, wherein each multimedia content segment of the sequence of multimedia content segments is at least one of: an image, a graphic, a video stream, a video clip, an audio stream, an audio clip, a video frame, a photograph, images of signals, and portions thereof.

10. The system of claim 8, wherein the periodic behavior pattern is related to at least one of: an object that appears in the sequence of multimedia content segments in regular time intervals, an event that occurs through the sequence of multimedia content segments in regular time intervals, and an activity that occurs through a number of consecutive segments in regular time intervals.

11. The system of claim 10, wherein the object, the event, and the activity are determined using a context of the received sequence of multimedia content segments.

12. The system of claim 8, wherein the periodic behavior pattern is identified upon identification of a number of consecutive content segments of matching signatures exceeding a decision threshold.

13. The system of claim 12, wherein at least two signatures match when the at least two signatures overlap more than a first preconfigured threshold level.

* * * * *